(No Model.)
M. L. NICHOLS.
BUTT RAKE AND EVENER FOR GRAIN BINDERS.
No. 414,162. Patented Oct. 29, 1889.
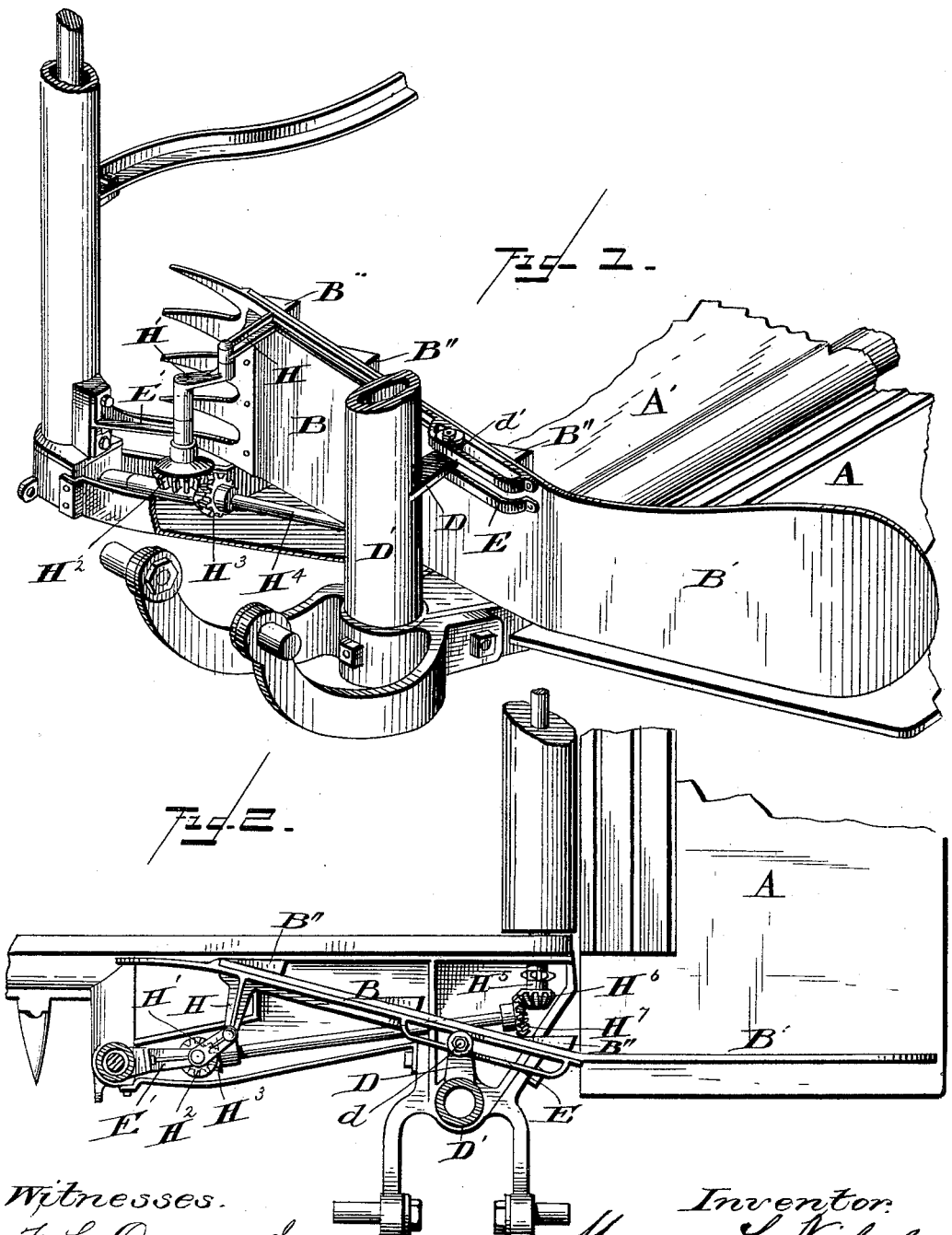

UNITED STATES PATENT OFFICE.

MARION L. NICHOLS, OF NEW YORK, N. Y.

BUTT RAKE AND EVENER FOR GRAIN-BINDERS.

SPECIFICATION forming part of Letters Patent No. 414,162, dated October 29, 1889.

Application filed February 7, 1889. Serial No. 299,056. (No model.)

*To all whom it may concern:*

Be it known that I, MARION L. NICHOLS, of New York, county of New York, State of New York, have invented new and useful Improvements in a Butt Rake and Evener for Grain-Binders, of which the following is a full and exact description, reference being had to the accompanying drawings, making part of this specification, in which—

My invention relates to improvements in butt rakes and evener combined.

The invention consists in forming with the butt-rake arranged to act on the grain to even it and assist in carrying the same forward by engaging said grain at a point near the inner end of the cutting apparatus to act upon the butts until the grain is within reach of the packers, and in combining with said rake a butt-evener to act upon the grain when being packed and bound.

It further consists in forming the operating-faces of said combined butt rake and evener on an angle to each other, and in pivoting the same near the point of connection, or centrally of the combined device, and in actuating the same from mechanism near the forward end of its rake portion, whereby while the forward end of the rake shall have an inward and backward movement toward the binding devices to straighten the grain and assist in carrying the same to said devices the rear end or tail extension thereof shall act as a butt-evener while the grain is being packed and bound, all as will hereinafter fully appear.

In the accompanying drawings, Figure 1 is a perspective view of the rake and the means for imparting the movement thereto, showing its relation to the canvas and binding-table. Fig. 2 is a plan or top view of the same.

The improvement hereinafter described is particularly intended to be used with a low-down platform-binder, in which the grain is delivered directly onto the binding-table A from the canvas A', and the combined rake and evener is mounted to act on the grain both while on the canvas and also after it is delivered to and is being acted upon by the packers and binding devices, and is constructed and operated in the following manner.

The device consists of a vertically-arranged board B B', a portion of which, or that B which acts upon the grain while on the canvas, extends from a point near the inner canvas roller to a point slightly beyond the inner shoe or divider, while the rear or tail extension B' extends from the inner roller to the discharge edge of the binding-table. Projecting from the inner face of the rake portion B are ribs or cleats B'' for engaging the butts of the grain to assist in carrying the same toward the packers. The operating-faces of these two portions B B' are preferably arranged at an angle to each other, as shown.

The device is supported near the center from a lug or projection D, extending from the inner face of the post D', mounted on the main harvester-frame, on which projection is mounted a vertical pin $d$, carrying a friction-wheel $d'$, which engages a slotted frame or guideway E, secured to the portion B, and which pin, in connection with the guideway, while forming a support for the combined rake and evener, permits an endwise reciprocation of the device, and also a vibrating movement of the same at both ends. The forward end of the portion B, as also the bearings for the shaft and gears by which it is driven, is supported from a lug E', extending from the side of the reel-post and operated in the following manner. From the front face of the portion B, near the forward end, projects an arm H, pivotally connected to a crank-shaft H'. This crank-shaft carries on one end a bevel-pinion $H^2$, which engages with and is driven from a bevel-wheel $H^3$ on a shaft $H^4$, inclining forward from the reel-post to the frame of the machine, and mounted in suitable bearings connected to said frame, and which shaft is driven from the shaft $H^5$ of the inner canvas-roller shaft by means of a bevel-pinion $H^6$, mounted thereon, and engaging a similar bevel-pinion $H^7$ on the inclined shaft.

From the foregoing it will be seen that the combined rake and butt-evener, being pivoted in the center and operated from the forward end, the rake portion will have an endwise and backward and forward movement to even up the butts while on the canvas, and also assist in carrying the grain forward to the packers, and that the rear end will be vibrated against the butts of the grain to even them up while the grain is being packed and during the binding action, in a manner that will be readily understood.

Having now described my invention, I claim—

In a combined butt rake and evener, the rake portion arranged to act on the grain at the discharge end of the canvas, and the extension or evener rigidly connected thereto, extending over the binding-table, said parts having a pivotal connection with the harvester-frame near their point of union, and devices connected near one end for actuating the same, substantially as described, whereby both a vibratory and reciprocating movement is imparted to the butt rake and evener, as set forth.

In testimony whereof I have hereunto set my hand this 31st day of December, A. D. 1888.

MARION L. NICHOLS.

Witnesses:
   ALEX. MAHON,
   F. L. OURAND.